(12) United States Patent
Maria

(10) Patent No.: US 7,565,692 B1
(45) Date of Patent: Jul. 21, 2009

(54) FLOATING INTRUSION DETECTION PLATFORMS

(75) Inventor: Arturo Maria, Bellevue, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 457 days.

(21) Appl. No.: 09/580,689

(22) Filed: May 30, 2000

(51) Int. Cl.
   *H04L 29/00* (2006.01)
(52) U.S. Cl. .............................. 726/23; 726/22; 726/24; 726/25; 713/190; 713/193; 713/194
(58) Field of Classification Search .................. 714/18; 395/187, 650; 713/200, 201, 190, 193, 194; 709/224, 225; 726/23, 22–25
   See application file for complete search history.

(56) References Cited

U.S. PATENT DOCUMENTS

| | | | | |
|---|---|---|---|---|
| 3,996,567 A | * | 12/1976 | Avsan | 713/502 |
| 5,684,957 A | * | 11/1997 | Kondo et al. | 726/25 |
| 5,796,942 A | | 8/1998 | Esbensen | 395/187 |
| 5,805,801 A | | 9/1998 | Holloway et al. | 395/187 |
| 5,848,233 A | | 12/1998 | Radia et al. | 395/187 |
| 5,958,010 A | | 9/1999 | Agarwal et al. | 709/224 |
| 5,960,170 A | * | 9/1999 | Chen et al. | 714/38 |
| 6,023,586 A | | 2/2000 | Gaisford et al. | 717/178 |
| 6,035,423 A | * | 3/2000 | Hodges et al. | 714/38 |
| 6,134,659 A | * | 10/2000 | Sprong et al. | 713/190 |
| 6,275,942 B1 | * | 8/2001 | Bernhard et al. | 713/201 |
| 6,347,375 B1 | * | 2/2002 | Reinert et al. | 713/200 |
| 6,401,238 B1 | * | 6/2002 | Brown et al. | 717/177 |
| 6,484,203 B1 | * | 11/2002 | Porras et al. | 713/201 |
| 6,530,025 B1 | * | 3/2003 | Nakagawa et al. | 726/4 |
| 6,725,377 B1 | * | 4/2004 | Kouznetsov | 726/23 |
| 6,735,702 B1 | * | 5/2004 | Yavatkar et al. | 713/200 |
| 6,842,781 B1 | * | 1/2005 | Lavian et al. | 709/223 |
| 2002/0003884 A1 | * | 1/2002 | Sprunk | 380/239 |

FOREIGN PATENT DOCUMENTS

WO   WO 99/57625   11/1999

OTHER PUBLICATIONS

Raj Yavatkar, David Putzolu, Sanjay Bakshi, Satyendra Yadav, "The Phoenix Framework: A Practical Architecture for Programmable Networks"; Mar. 2000; IEEE Communications Magazine; pp. 160-165.*

(Continued)

*Primary Examiner*—Carl Colin
(74) *Attorney, Agent, or Firm*—Michael J. Donohue; Daivs Wright Tremaine, LLP

(57) ABSTRACT

The present invention is a "floating" intrusion detection system that can use any computer on the network as an intrusion detection platform. A software agent program called a "socket" is installed on each computer that is to be available to be an intrusion detection platform. A central server contains intrusion detection software as well as a database containing knowledge based rules and profiles for detecting intrusions. The central server can contact any computer that has a socket installed and direct that computer to become an intrusion detection platform. The selected computer then downloads, installs, and runs the intrusion detection software thus becoming an intrusion detection platform. Once the need has passed the central server can direct some of the platforms to stop running the software and return to their normal state.

37 Claims, 3 Drawing Sheets

OTHER PUBLICATIONS

"What is Intrusion Detection"; "http://searchsecurity.techtarget.com/sDefinition/0,,sid14_gci295031,00.html"; pp. 1-2.*

"What is intrusion detection system?—A Word Definition From the Webopedia"; "www.webopedia.com/TERM/I/intrusion_detection_system.html"; pp. 1-3.*

"Intrusion Detection"; "http://en.wikipedia.org/wiki/Intrusion_detection"; pp. 1-2.*

Wayne Jansen, Peter Mell, Tom Karygiannis, Don Marks; "Applying Mobile Agents to Intrusion Detection and Response"; Oct. 1999; National Institute of Standards and Technology Computer Security Division; NIST Iterim Report (IR)—6416; pp. 1-46.*

"Intrusion Detection FAQ: Can the volume of network traffic get high enough to exceed the capability of the detectors?"; 1998;pp. 1-2. "http://www.sans.org/resources/idfaq/network_traffic.php".*

*Check Point Real Secure*, http://www.checkpoint.com/products/firewall-1/realsecure.html, Apr. 7, 2000.

*Black ICE Pro*, http://www.networkice.com/products/blackice/blackice%20pro.htm, Apr. 7, 2000.

*eTrust Intrusion Detection Overview*, http://www.cai.com/solutions/enterprise/etrust/intrusion_detection/product_.../sw3_overview.ht, Apr. 7, 2000.

* cited by examiner

FLOATING INTRUSION DETECTION PLATFORMS

FIELD OF THE INVENTION

The present invention is directed to a method and system for providing dynamically distributed network security and intrusion detection.

BACKGROUND OF THE INVENTION

The importance of computer networks to companies' business interests and the interconnected nature of computer networks in the Internet era has resulted in increased concern about unauthorized network intrusions. When successful, these intrusions can cause damaging losses to the owner of the penetrated network in the form of vandalism, corporate espionage, theft of computer resources (when an intruder uses the penetrated network's computer resources for their own purposes, including attacking other networks), and negative publicity. Even just the potential of intrusion results in significant expenditures on computer resources to defend the network against intrusions including firewalls, proxy servers, and other intrusion detection and prevention systems.

Intrusion detection platforms are known. They are specialized hardware or software systems that use knowledge based rules and artificial intelligence concepts to detect attacks on computer networks so that defensive action can be taken. Examples of software used to implement intrusion detection platforms include Computer Associates' SessionWall, Check Point Software's RealSecure, and NetworkICE's BlackICE.

One type of intrusion detection system uses intrusion detection platforms placed at the entry points to networks where they inspect incoming network packets for signs that the packets are being employed in an attack on the network. If an attack is detected the intrusion detection platform may take several actions including alerting the system users, and refusing to allow the packets to enter the network. A primary drawback of these systems is that they require valuable computer hardware to be diverted from other uses and dedicated to simply monitoring and preventing intruders. Furthermore, in order to protect against insiders, such as disgruntled employees, these intrusion detection platforms generally must be distributed throughout the network in order to provide protection for the entire network, and in the event of a large scale attack or an attack localized to a particular area of the network, it is difficult to add new platforms or relocate existing platforms on short notice.

Another type of intrusion detection system resides on every computer in a network, and every computer monitors its own network security and reports back to a centralized server. These systems also have drawbacks because a portion of the processing power on every computer is dedicated to intrusion detection resulting in a loss of performance to every user.

SUMMARY OF THE INVENTION

The present invention is a "floating" intrusion detection system that can dynamically change which computers on the network are acting as intrusion detection platforms. A software agent program called a "socket" is installed on each computer that is to be available to be an intrusion detection platform. A central server contains intrusion detection software as well as a database containing knowledge based rules and profiles for detecting intrusions. The central server can contact any computer that has a socket installed and directed that computer to become an intrusion detection platform. The selected computer than downloads, installs, and runs the intrusion detection software thus becoming an intrusion detection platform. The present invention allows the system to respond to network attacks or to simply respond to increases in network traffic by increasing the number of intrusion detection platforms whenever necessary. Once the need has passed, the central server can direct some of the platforms to stop running the software and return to their normal state. If a particular segment of the network is being attacked, more intrusion detection platforms could be added in that area without affecting other areas of the network. The present invention also allows a company to make more efficient use of their computer hardware. A computer that is used for a print server or scanner station during the work day could become an intrusion detection system at night without any human direction.

DETAILED DESCRIPTION

Figure 1:
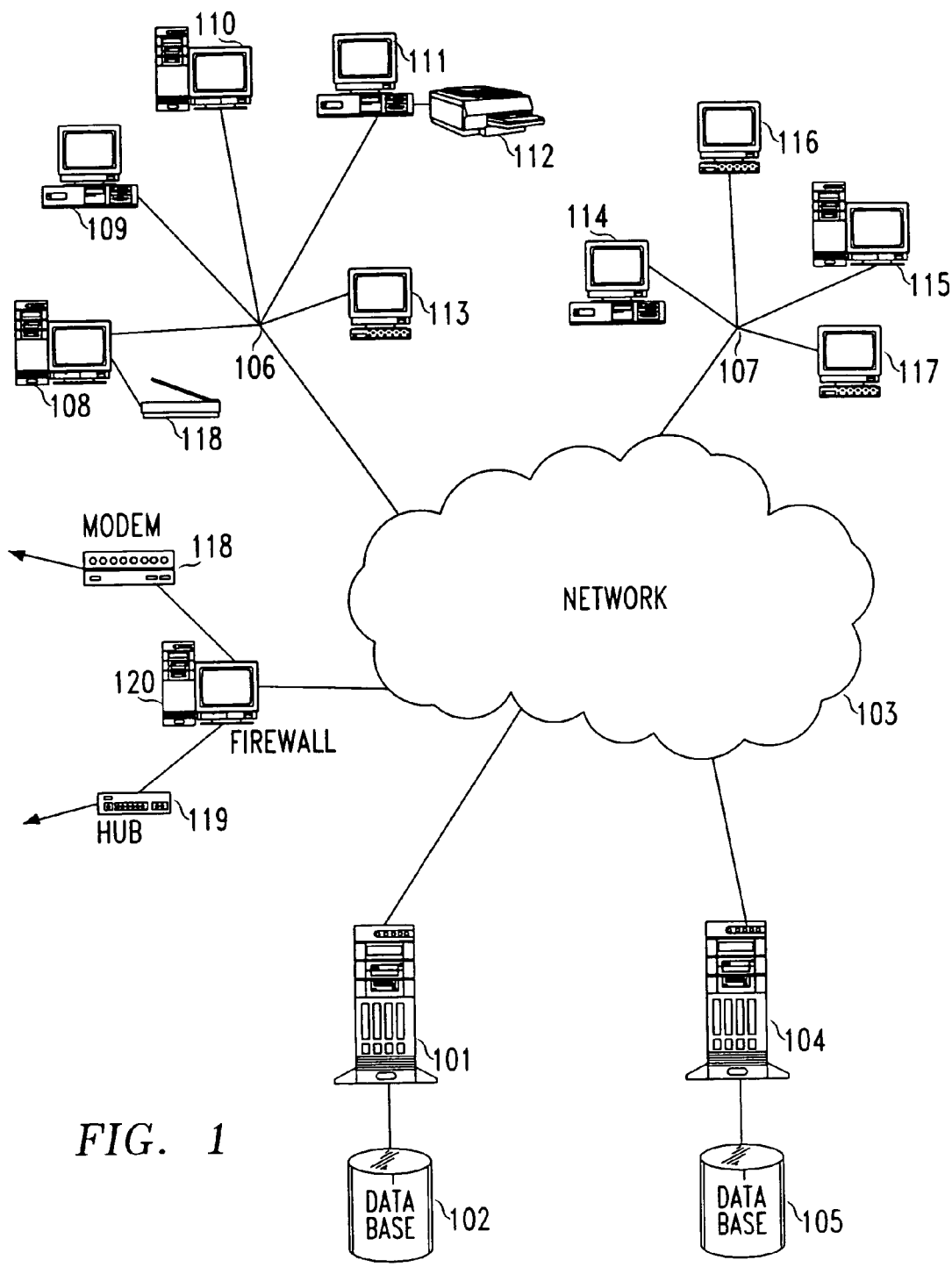
FIG. 1 illustrates an example of a network in which the present invention might be implemented.

FIG. 1 is a diagram of an exemplary network suitable for use with the present invention. Network 103 may be any conventional network for data transmission including, for example, Ethernet, token ring, or RF hardware using TCP/IP, IPv6, or another appropriate network protocol. Network 103 may also include connections to other networks, including the Internet, via, for example, a direct connection (Hub 119) or a dial up connection (Modem 118) and typically employs a firewall 120 as a first line of defense against network intrusions. Connected to network 103 are servers 101 and 104 which may be conventional file servers capable of executing intrusion detection server software and may include databases 102 and 105. Connected to network 103 may also be a variety of typical computers (108-111, 114, and 115) and workstations (113, 116, and 117), some of which may also be connected to printers (112), scanners (118), or other peripheral equipment. These computers and workstations may also be separated into network segments 106 and 107. These network segments may be physically separated, logically separated, or both.

The deployment of the floating intrusion detection system of the present invention may be controlled or coordinated via a floating intrusion detection server (e.g., server 101). This server is equipped with a database that stores information about the network for which the server is detecting intrusions as well as a knowledgebase containing rules that define the server's operation including rules for identifying and responding network intrusions, performing system maintenance, and scheduling predetermined system tasks. The information about the network that is stored in the database can include a network map, and/or a list of the computers within the network and their network addresses. Using this information the server can determine which computers in the network have been designated to be available for use as floating intrusion detection platforms. On each computer that has been so designated, there is a software agent program or "socket" running. The socket is a program that generally runs as a background process and listens for network messages from the floating intrusion detection server. The floating intrusion detection server can send messages to the socket at a computer instructing the socket to perform certain tasks including installing intrusion detection software, executing the intrusion detection software, and ceasing the execution of the intrusion detection software. The socket can also send messages back to the server containing information about the status of the computer.

Figure 2:
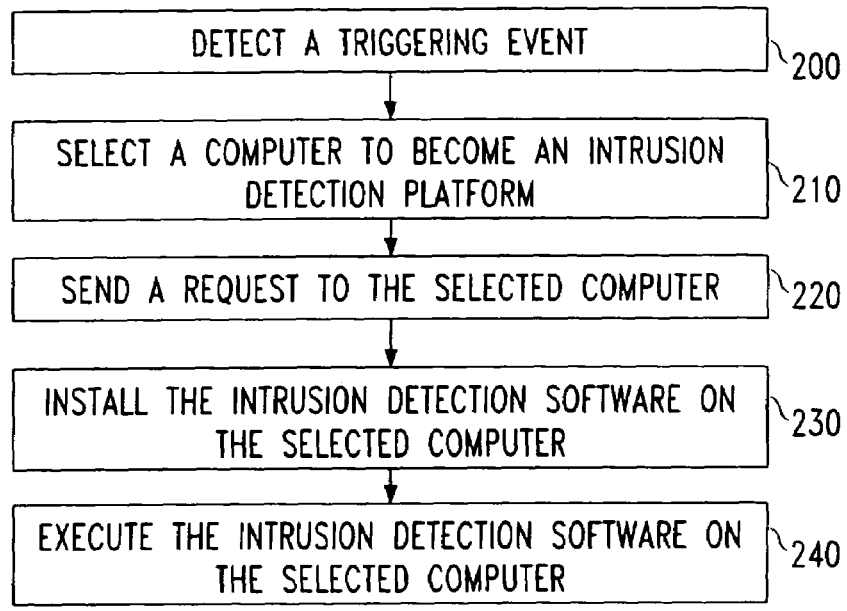
FIG. 2 is a flow chart illustrating one possible implementation of the method of the present invention.

As illustrated in FIG. 2, according to one embodiment of the present invention, when server 101 detects or is notified of a triggering event (Step 200), such as a possible network intrusion, the server selects an appropriate computer to become an intrusion detection platform (Step 210). The server then sends a request to the socket on that computer to become an intrusion detection platform (Step 220). The socket then installs (Step 230) and executes (Step 240) the intrusion detection software.

For example, server 101 may receive a message from firewall 120 indicating that an unusual number of incoming network packets directed at network segment 107 have been detected. In response to this message, server 101, using the information about the network stored in database 102, selects computer 114, which is on segment 107, to become an intrusion detection platform. Server 101 then sends a message to the socket on computer 114, requesting that computer 114 become an intrusion detection platform. The socket on computer 114 receives the request, installs the intrusion detection software, and executes it. Thus an intrusion detection platform has been created that is at or near the target of the network attack.

Figure 4:
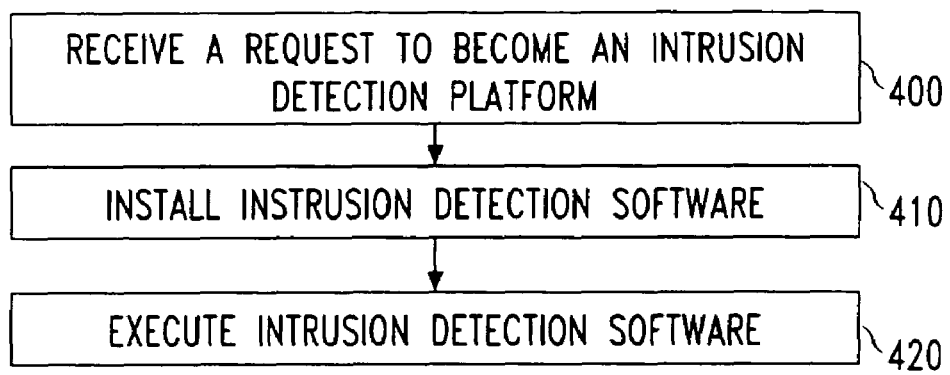
FIG. 4 is a flow chart illustrating one possible implementation of the method of the present invention.

FIG. 4 illustrates the actions taken by the socket on a remote computer according to one possible embodiment of the present invention. The socket receives a request from the intrusion detection server to become an intrusion detection platform (Step 400). The socket installs the intrusion detection software on the computer on which the agent is running (Step 410). The socket then executes the intrusion detection software and the computer begins functioning as an intrusion detection platform (Step 420).

The installation of the software on the computer may be accomplished in any number of ways. For example, the socket may download the software from a file server, the software may already be on the computer in a compressed archive, or the software may be attached to the request that came from the intrusion detection server. Additionally, the software installation may be accomplished in a multi-step process where components of the software are downloaded and installed from different locations. For example, the core software may be installed from a local archive and the latest update may be downloaded from a remote file server. Alternatively, the software may already be installed on the computer, and the socket only needs to check for software updates before executing the software.

The triggering event that causes the server to initiate new intrusion detection platforms may be defined by the administrator of the system, including, for example, increases or decreases in network traffic, unusual network traffic patterns, detection of network attacks by existing intrusion detection platforms or any other suspicious network activity. Additionally, the triggering event could simply be based on time of day, day of the week, etc. For example, since many network attacks occur after normal working hours, the system of the present invention could be configured to increase the number of intrusion detection platforms during these hours.

The intrusion detection server need not create more intrusion detection servers in response to every triggering event but may consider a number of factors before creating more platforms, including, for example, the number of intrusion detection platforms that already exist, the number of idle or underutilized eligible computers in the network, and predetermined minimum and maximum limits on the number of platforms.

As a complement to the triggering events that cause more intrusion detection platforms to be created, the present invention also allows for "stop conditions" which are events or conditions that result in a computer ceasing execution of the intrusion detection software. These stop conditions may include, for example, the ceasing of the triggering event or condition that caused the intrusion detection platform to be created, a time period that has elapsed since the computer became an intrusion detection platform, or a request from a human operator. These "stop conditions" may be monitored or detected at the intrusion detection server which then sends a message to the intrusion detection platform instructing it to cease operating as an intrusion detection platform. Alternatively, the intrusion detection platform may monitor the stop condition itself and cease executing the intrusion detection software when the condition is fulfilled.

Triggering events and stop conditions may be specific to a particular computer or they may apply generally to all of the computers eligible to be intrusion detection platforms. For example, computer 111 may be designated to act as a print server for printer 112 during business hours and as an intrusion detection server after hours. Server 101 may have a triggering event and a stop condition specific to computer 111 in order to accomplish this schedule. Server 101 may also have a triggering event for a suspected network breach that directs server 101 to select any one (or more) of the eligible computers and request it to become an intrusion detection platform. Similarly, server 101 may maintain a stop condition that when a network attack ceases, server 101 selects a number of intrusion detection platforms and requests them to cease acting as intrusion detection platforms.

Figure 3:
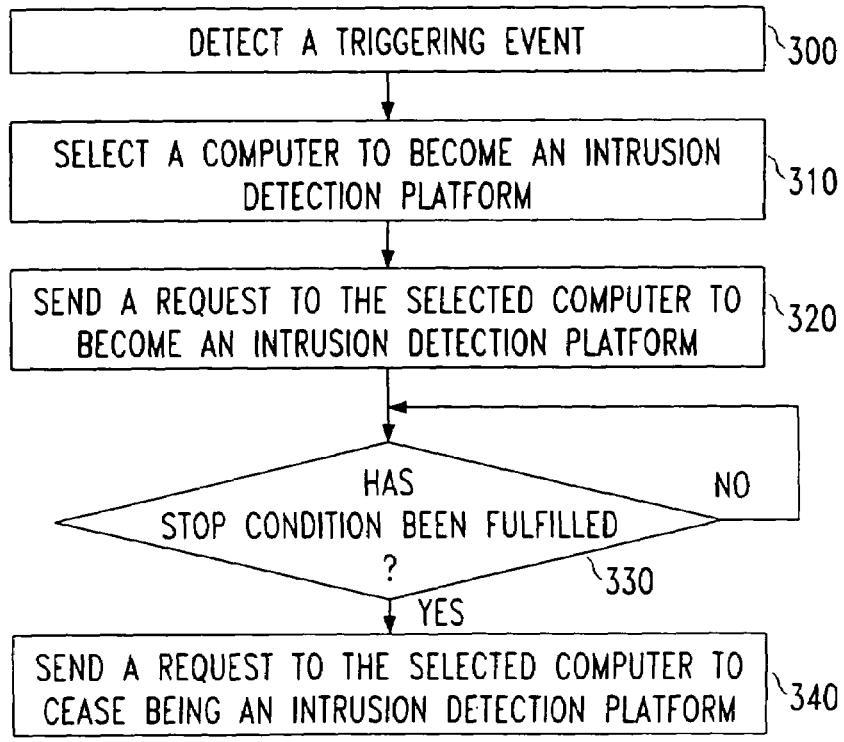
FIG. 3 is a flow chart illustrating another possible implementation of the method of the present invention including a stop condition.

FIG. 3 illustrates one possible embodiment of the present invention for monitoring the stop condition at the intrusion detection server. Server 101 detects a triggering event (Step 300), selects an appropriate computer to become an intrusion detection platform, for example computer 110, (Step 310), and sends a request to the socket on computer 110 to become an intrusion detection platform (Step 320). Server 101 then monitors to detect if the stop condition has been fulfilled (Step 330). If the stop condition has not been fulfilled then server 101 continues to monitor, but if the stop condition has been fulfilled, server 101 sends a request to computer 110 to stop acting as an intrusion detection platform (Step 340).

Figure 5:
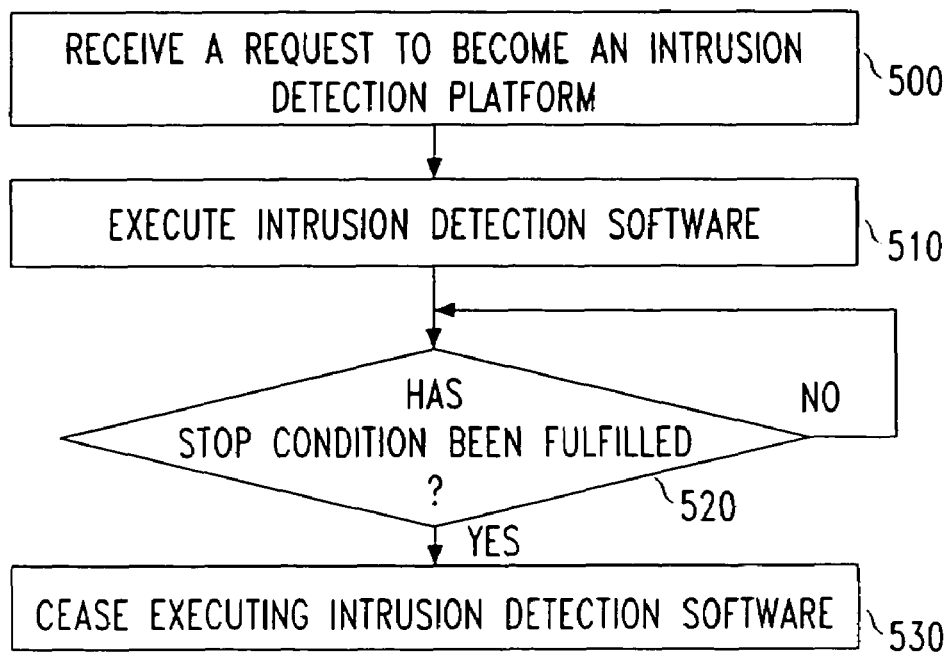
FIG. 5 is a flow chart illustrating another possible implementation of the method of the present invention including a stop condition.

FIG. 5 illustrates one possible embodiment of the present invention for monitoring the stop condition at the intrusion detection platform. The socket receives a request from the intrusion detection server to become an intrusion detection platform (Step 500). The socket executes the intrusion detection software and the computer begins functioning as an intrusion detection platform (Step 510). The socket and/or the intrusion detection software then monitors to see if the stop condition has been fulfilled (Step 520). This monitoring may be as simple as checking the date and time or the amount of time the computer has been functioning as a intrusion detection platform, or may be more sophisticated monitoring of network traffic conditions. Once the stop condition has been fulfilled, the intrusion detection software ceases executing, the socket returns to the background and awaits further messages from the server (Step 530).

Some embodiments of the present invention may require that a number of messages be exchanged between the intrusion detection server and the sockets or intrusion detection software on the remote computers. In order to protect the intrusion detection system from being compromised by network attackers, these messages may be protected cryptographically. For example, the messages may be encrypted to prevent attackers from reading them, digitally signed to authenticate the sender, sent with a checksum or message digest to detect tampering, or any combination thereof. The encryption and digital signatures could use any of a number of well known techniques including RSA and DES. A number of secure checksum techniques are also known in the art.

To further protect the intrusion detection system from tampering or simple equipment failure, a secondary server may be employed in the system that maintains copies of the data on the primary server and immediately takes over if the primary server ceases operating correctly. This may be accomplished, for example, by server 101 sending updates to server 104 and database 105, or alternatively, server 104 could monitor server 101's network traffic in order to monitor server 101's activities.

The present invention is not limited to the specific embodiments described. It is expected that those skilled in the art will be able to devise other implementations that embody the principles of the present invention and remain within its scope.

What is claimed is:

1. A method for implementing an intrusion detection system in a network, comprising:
    receiving a request from a central server at a software agent program installed on one of a plurality of remote computers to initiate an intrusion detection service, wherein the request is issued by the central server in response to a notification of a network intrusion, wherein the intrusion detection software includes a stop condition indicating when to stop executing the intrusion detection software, wherein the stop condition includes a condition that no intrusion has been detected for a period of time;
    installing intrusion detection software on said remote computer via said software agent program in response to the request from the central server; and
    executing said intrusion detection software on said remote computer via said software agent program.

2. The method of claim 1 further comprising:
    receiving from the central server a request to terminate intrusion detection services at said software agent program.

3. The method of claim 2 further comprising:
    monitoring for fulfillment of a stop condition; and
    ceasing the execution of the intrusion detection software when the stop condition is fulfilled.

4. The method of claim 3 wherein said stop condition is based on network traffic conditions.

5. The method of claim 3 wherein said stop condition is an expiration time.

6. The method of claim 2, further comprising monitoring for fulfillment of a stop condition at each of the plurality of remote computers executing intrusion detection software.

7. The method of claim 6, wherein the stop condition for each of the plurality of computers is based on a time during which each of the plurality of computers has been executing instruction detection software.

8. The method of claim 1 further comprising the step of:
    selecting said remote computers from a plurality of eligible computers.

9. The method of claim 8 wherein said selecting step is accomplished based on a network map.

10. The method of claim 8 wherein said selecting step is accomplished based on a knowledge base.

11. The method of claim 8 wherein said request is verified using a cryptographic authentication scheme.

12. The method of claim 1 wherein said request is verified using a cryptographic authentication scheme.

13. The method of claim 1 wherein said request includes a stop condition indicating when to stop executing the intrusion detection software.

14. The method of claim 13 wherein said stop condition is an expiration time.

15. The method of claim 13 wherein said stop condition is based on network traffic conditions.

16. The method of claim 13, wherein the stop condition applies to all eligible computers.

17. The method of claim 1, wherein intrusion detection services are initiated at a plurality of remote computers selected based on a number of intrusion detection platforms that are currently active.

18. The method of claim 1, wherein intrusion detection services are initiated at a plurality of remote computers selected based on predetermined numbers of maximum and minimum limits on a number of intrusion detection platforms.

19. A system for detecting intrusions in a computer network comprising:
    a plurality of computers executing software agents;
    a database configured to store at least one rule defining at least one response to a network intrusion; and
    an intrusion detection server configured to send a request to install and execute intrusion detection software to software agents at the plurality of the computers when intrusion detection services are needed based on the at least one rule stored in said database, wherein the intrusion detection software includes a stop condition indicating when to stop executing the intrusion detection software, wherein the stop condition includes a condition that no intrusion has been detected for a period of time.

20. The system of claim 19 wherein said intrusion detection server increases the number of said plurality of computers executing intrusion detection software when a network intrusion is detected.

21. The system of claim 19 wherein said intrusion detection server changes the number of said plurality of computers executing intrusion detection software when the level of network traffic changes.

22. The system of claim 19 wherein said intrusion detection server changes the number of said plurality of computers executing intrusion detection software depending on the time of day.

23. The system of claim 19 wherein said database contains information about the plurality of computers.

24. The system of claim 23 wherein said information includes a map of said computer network.

25. The system of claim 19 wherein said database contains a knowledge base.

26. An article of manufacture comprising a computer-readable medium having stored thereon instructions adapted to be executed by a processor, the instructions which, when executed, define a series of steps to be used to perform network intrusion detection, said steps comprising:

receiving notification of a network intrusion at a central server;

transmitting an intrusion detection software installation request from the central server to a plurality of remote computers in response to the notification, wherein the request includes a stop condition indicating when to stop executing the intrusion detection software, wherein the stop condition includes a condition that no intrusion has been detected for a period of time; and installing intrusion detection software on the plurality of remote computers via a software agent program in response to the request.

27. The article of manufacture of claim 26, further comprising the step of selecting said remote computers from a plurality of eligible computers based on the notification of a network intrusion.

28. The article of manufacture of claim 27 wherein said selecting step is accomplished based on a network map.

29. The article of manufacture of claim 27 wherein said selecting step is accomplished based on a knowledge base.

30. The article of manufacture of claim 26 wherein said request is verified using a cryptographic authentication scheme.

31. The article of manufacture of claim 26 wherein said stop condition is an expiration time.

32. The article of manufacture of claim 26 wherein said stop condition is based on network traffic conditions.

33. A method for intrusion detection in a network comprising:

receiving indication of a possible network intrusion;

selecting one of a plurality of computers in the network to become an intrusion detection platform, wherein selecting one of the plurality of computers is based on the indication of a possible network intrusion;

sending a request from a central server to the selected computer to install and execute intrusion detection software, wherein the request is sent in response to the received indication of the possible network intrusion; and sending a message to the selected computer to cease execution of the intrusion detection software when a stop condition is detected, wherein the stop condition includes a condition that no intrusion has been detected for a period of time.

34. The method of claim 33 wherein receiving the indication of a possible network intrusion comprises receiving an indication of a part of the network that is a target of the possible network intrusion; and wherein selecting one of the plurality of computers is based on the indication of the target of the possible network intrusion.

35. The method of claim 34 wherein selecting one of the plurality of computers is based on the indication of the target of the possible network intrusion comprises selecting a computer at or near the target of the possible network intrusion.

36. The method of claim 33 wherein selecting one of the plurality of computers is based on the indication of a possible network intrusion includes selecting of the computer based on an unusual pattern of network traffic.

37. The method of claim 33 wherein selecting one of the plurality of computers if is based on the indication of a possible network intrusion includes selecting one of the plurality of computers based on an unusual number of incoming network packets directed at a network segment.

* * * * *